(12) United States Patent
Liu et al.

(10) Patent No.: US 9,021,593 B2
(45) Date of Patent: Apr. 28, 2015

(54) XSS DETECTION METHOD AND DEVICE

(75) Inventors: Guangxu Liu, Beijing (CN); Yujie Wen, Beijing (CN); Da Zhou, Beijing (CN); Xiaoming Wang, Beijing (CN); Xiaoxia Liu, Beijing (CN)

(73) Assignee: NSFOCUS Information Technology Co., Ltd., Beijing (CN)

( * ) Notice: Subject to any disclaimer, the term of this patent is extended or adjusted under 35 U.S.C. 154(b) by 43 days.

(21) Appl. No.: 13/386,206

(22) PCT Filed: Jul. 23, 2010

(86) PCT No.: PCT/CN2010/001119
§ 371 (c)(1),
(2), (4) Date: Apr. 4, 2012

(87) PCT Pub. No.: WO2011/009295
PCT Pub. Date: Jan. 27, 2011

(65) Prior Publication Data
US 2012/0198558 A1    Aug. 2, 2012

(30) Foreign Application Priority Data

Jul. 23, 2009 (CN) .......................... 2009 1 0089786

(51) Int. Cl.
*G06F 11/00* (2006.01)
*G06F 21/53* (2013.01)
(Continued)

(52) U.S. Cl.
CPC ................. *G06F 21/53* (2013.01); *G06F 21/56* (2013.01); *G06F 21/577* (2013.01);
(Continued)

(58) Field of Classification Search
CPC ............ H04L 63/1483; H04L 63/1433; H04L 63/1466; H04L 63/1475; G06F 21/53; G06F 21/577; G06F 2221/2119; G06F 21/56

USPC ....................... 726/4, 12, 22, 25, 26; 713/164
See application file for complete search history.

(56) References Cited

U.S. PATENT DOCUMENTS 6,996,845 B1 * 2/2006 Hurst et al. .................... 726/25
7,343,626 B1 * 3/2008 Gallagher ....................... 726/25
(Continued)

FOREIGN PATENT DOCUMENTS

| CN | 101471781 A | 1/2009 |
|---|---|---|
| CN | 101459548 A | 6/2009 |
| JP | 2007241906 A | 9/2007 |

OTHER PUBLICATIONS

SmartAttack, Cenzic, available at http://doc.cenzic.sadoc9x14ba847/CPL0001011.htm (wayback machine dated Dec. 22, 2007).*

(Continued)

*Primary Examiner* — Taghi Arani
*Assistant Examiner* — Sharon Lynch
(74) *Attorney, Agent, or Firm* — Withrow & Terranova, P.L.L.C.

(57) ABSTRACT

The present invention discloses a XSS detection method for detecting the XSS vulnerabilities in a web page, comprising for each parameter-value pair in a set of parameter-value pairs that can be accepted by the web page: constructing a parameter-value pair in which a dedicated script is inserted; assembling a URL corresponding to the web page based on the parameter-value pair in which a dedicated script is inserted; acquiring the dynamic web page content corresponding to the assembled URL; and simulating the execution of the acquired dynamic web page content, if the dedicated script is executed, it is determined that the processing of the parameter in the web page contains XSS vulnerabilities. The present invention further discloses a corresponding XSS detection device and a web site security scanning system and a web scanning system using such a device.

9 Claims, 3 Drawing Sheets

(51) Int. Cl.
    *G06F 21/56*    (2013.01)
    *G06F 21/57*    (2013.01)
    *H04L 29/06*    (2006.01)

(52) U.S. Cl.
    CPC ... G06F 2221/2119 (2013.01); *H04L 63/1475* (2013.01); *H04L 63/1483* (2013.01); *Y10S 707/99933* (2013.01); *Y10S 707/99939* (2013.01)

(56) References Cited

U.S. PATENT DOCUMENTS

| | | | | |
|---|---|---|---|---|
| 8,112,799 | B1* | 2/2012 | Loiodice et al. | 726/22 |
| 8,578,482 | B1* | 11/2013 | Yang et al. | 726/22 |
| 2002/0010855 | A1* | 1/2002 | Reshef et al. | 713/164 |
| 2002/0059078 | A1* | 5/2002 | Valdes et al. | 705/1 |
| 2003/0097591 | A1* | 5/2003 | Pham et al. | 713/201 |
| 2003/0159063 | A1* | 8/2003 | Apfelbaum et al. | 713/200 |
| 2006/0253458 | A1* | 11/2006 | Dixon et al. | 707/10 |
| 2006/0253578 | A1* | 11/2006 | Dixon et al. | 709/225 |
| 2006/0253581 | A1* | 11/2006 | Dixon et al. | 709/225 |
| 2006/0253584 | A1* | 11/2006 | Dixon et al. | 709/225 |
| 2007/0061877 | A1* | 3/2007 | Sima et al. | 726/12 |
| 2007/0107057 | A1* | 5/2007 | Chander et al. | 726/22 |
| 2008/0109473 | A1* | 5/2008 | Dixon et al. | 707/102 |
| 2008/0114709 | A1* | 5/2008 | Dixon et al. | 706/13 |
| 2008/0148408 | A1* | 6/2008 | Kao et al. | 726/25 |
| 2008/0320567 | A1 | 12/2008 | Shulman et al. | |
| 2009/0119777 | A1* | 5/2009 | Jeon | 726/25 |
| 2009/0282480 | A1* | 11/2009 | Lee et al. | 726/22 |
| 2010/0017880 | A1* | 1/2010 | Masood | 726/24 |
| 2010/0050263 | A1* | 2/2010 | Weisman | 726/25 |
| 2010/0083240 | A1* | 4/2010 | Siman | 717/144 |
| 2010/0257610 | A1* | 10/2010 | Hohl | 726/25 |
| 2010/0293616 | A1* | 11/2010 | Young | 726/25 |

OTHER PUBLICATIONS

Omar Ismail et al., A Proposal and Implementation of Automatic Detection/Collection System for Cross-Site Scripting Vulnerability, in Proceedings of the 18th International Conference on Advanced Information Networking and Application (2004).*

Adam Kiezun et al., Automatic Creation of SQL Injection and Cross-Site Scripting Attacks, in $31^{st}$ International Conference in Software Engineering 199-209 (May 2009).*

Hossain Shahriar and Mohammad Zulkernine, MUTEC: Mutation-Based Testing of Cross Site Scripting, in Workshop in Software Engineering for Secure Systems 47-53 (May 2009).*

International Search Report for PCT/CN2010/001119 mailed on Nov. 4, 2010.

Kosuga, Yuki, "An Effective Audit Testing for Detecting Vulnerabilities in Web Applications," IPSJ SIG Technical Report, Jun. 15, 2009, pp. 1-8.

Toshihama, Sachiko, "Typical Web 2.0 Attack Vectors and Countermeasure," IPSJ Magazine, vol. 50, No. 1, Jan. 15, 2009, pp. 44-54.

Japanese Office Action for Japanese Patent Application No. 2012-520889, mailed Oct. 25, 2013, 45 pages.

* cited by examiner

XSS DETECTION METHOD AND DEVICE

This application is a 35 USC 371 national phase filing of PCT/CN2010/001119, filed Jul. 23, 2010, which claims priority to Chinese application 200910089786.8, filed Jul. 23, 2009, the disclosures of which are incorporated herein by reference in their entireties.

TECHNICAL FIELD

The present invention relates to the technical field of security scanning and analysis of web sites, in particular to a method and a device for detecting whether web pages in a web site have XSS (Cross Site Scripting) vulnerabilities.

BACKGROUND ART

XSS began to be disclosed in the 1990s, and since then its finding and utilization have drawn much attention. XSS, i.e., cross site scripting, is one of the approaches of stealing information from a user by taking advantage of web site vulnerabilities. When the user navigates through web sites, uses instant messaging software or reads emails, he will usually click on the links therein. Malicious hackers insert malicious codes in the links, so that when the user clicks on the links, the web server for generating a corresponding web page will have XSS vulnerabilities due to not filtering malicious codes and generate a web page containing malicious codes, which web page seems like a legal web page to be generated by the web site. Consequently, the malicious codes are executed in the user's computer to steal the user information bypassing the local security mechanism of the user, or even to launch Trojan attacks in the user machine to acquire control right of the user machine remotely. The hackers usually adopt hexadecimal encoding (or other encoding manners) to encode the links lest the user to doubt the legality of the link. XSS exists universally in the Internet currently, which poses an enormous threat to direct users. In recent years, XSS has beaten the Buffer Overflow and topped the most popular security vulnerabilities. About at least 68% of the web sites have XSS vulnerabilities.

The XSS detection can be divided into remote active detection and local passive detection in view of the approach of detection. The local passive detection technique is mainly applied in the browser, and currently, both IE8 and the noscript plug-ins of Firefox support XSS detection. The remote active detection is mainly applied in the detection tools such as remote vulnerability scanners. The present invention focuses on making improvement with respect to the remote detection technique.

With the enhanced knowledge of security, web site programmers may perform some special processing of the parameters input by the user, and the special processing brings some difficulties to the remote scanning of XSS vulnerabilities, and especially, it can easily bring false alarms to the remote scanning.

Several approaches for the remote scanning of XSS vulnerabilities of web servers have been proposed. U.S. Pat. No. 7,343,626B1 has disclosed a method and a system for automated detection of XSS vulnerabilities in a web site to be tested, comprising: for a web page of the web site, finding out all the parameter-value pairs; for each parameter-value pair, constructing a dedicated tracer value and submitting the constructed parameter-value pair to the web server to request for a web page; if the dedicated tracer value is found in the returned web page, it means that the web page may have XSS vulnerabilities; based on the position in the web site where the dedicated tracer value appears, constructing a second dedicated tracer value comprising a script and submitting the second dedicated tracer value to the web server, and determining whether the web page has XSS vulnerabilities depending on whether the returned web page executes the script. However, according to the method disclosed in the U.S. Pat. No. 7,343,626B1, the parameter-value pairs should be submitted twice, which results in low execution efficiency. In addition, the method also requires constructing a second dedicated tracer value comprising a script based on the position where the dedicated tracer value appears, and with the development of network techniques, XSS vulnerabilities may appear in other positions, and as a result, the method may not be able to detect the XSS vulnerabilities comprehensively.

Some open source software have also disclosed other methods for remote detection of XSS vulnerabilities, and the principle is generally as follows: for a certain web page to be detected, first determining the parameter-value pair accepted by the web page, and then for each parameter, constructing a dedicated value and making a request to the web server for the web page utilizing the specially constructed parameter-value pairs, and finally determining whether vulnerabilities exist depending on the returned information. The methods for analyzing the returned information adopt a matching based on the regular expressions. In the detection methods of the open source software, the returned information is analyzed by regular expressions matching based on characterized strings to determine whether XSS vulnerabilities exist, which in certain cases, may give rise to false alarms or omissions. Furthermore, for DOM-based XSS vulnerabilities, these methods cannot determine whether the vulnerabilities can be triggered. For instance, although the returned web page comprises the constructed dedicated value, the dedicated value cannot be executed, these methods still consider that the web page contains XSS vulnerabilities, and this is, however, not the case actually.

It can be seen that in this technical field, no method or device can completely and effectively detect XSS vulnerabilities yet. The present invention attempts to provide a solution for completely automated detection of XSS vulnerabilities in a comprehensive and effective manner by improving the methods proposed in the open source software.

Contents of the Invention

The applicant of the present invention has found that the ultimate consequence of XSS vulnerabilities is to execute unexpected script codes in the machine of the victim, so XSS vulnerabilities can be detected comprehensively if a javascript parsing engine is utilized to determine whether unexpected script codes have been executed in the machine of the victim. The present invention is put forth based on this.

According to an aspect of the present invention, a XSS detection method for detecting the XSS vulnerabilities in a web page is provided, comprising steps of: determining a set of parameter-value pairs that can be accepted by the web page; and for each parameter-value pair in the set: constructing a parameter-value pair in which a dedicated script is inserted; assembling a URL corresponding to the web page based on the parameter-value pair in which the dedicated script is inserted; acquiring the dynamic web page content corresponding to the assembled URL; and simulating the execution of the acquired dynamic web page content, if the dedicated script is executed, then the processing of the parameter in the web page has XSS vulnerabilities.

According to an embodiment of the present invention, in the step of simulating the execution of the acquired dynamic web page content, a script parsing engine is used to simulate the execution of the web page content, the script parsing engine is constructed to determine whether XSS vulnerabilities exist depending on whether the dedicated script has been triggered.

According to a further aspect of the present invention, a XSS detection device for detecting XSS vulnerabilities in a web page is provided, comprising: a web page parameter-value pair set determining unit being configured to determine a set of parameter-value pairs that can be accepted by the web page; a testing URL assembler being configured to assemble a testing URL for each parameter-value pair in the set of parameter-value pairs, wherein a dedicated script is inserted in the value during the assembly of the testing URL; a communicator being configured to send the testing URL to the web server and receive the web page content returned form the web server; and a simulator being configured to simulate the execution of the web page content and determine the existence of XSS vulnerabilities in the corresponding parameter when the dedicated script being executed.

According to an embodiment in the present invention, the XSS detection device further comprises a script parsing engine, with which the simulator executes the script when simulating the execution of the web page content, and the script parsing engine determines whether XSS vulnerabilities exist in the corresponding parameter depending on whether the dedicated script has been triggered.

The present invention determines whether a dynamic web page has XSS vulnerabilities by assembling a URL with parameter values having a dedicated script and detecting whether the dedicated script is triggered by the dynamic web page content returned from the URL. Compared with the traditional approach of characteristic matching by simply determining whether the corresponding content will appear in the dynamic web page, the present invention boasts of higher accuracy and a more comprehensive detection.

DRAWINGS

Other advantages and benefits of the present invention will be clear and obvious to those skilled in the art from the detailed description of the preferred embodiments in the following text. The drawings are only used for the purpose of showing the preferred embodiments and should not be construed as limiting the invention. The same reference signs represent the same components throughout the drawings, where the letter signs following the reference number indicate a plurality of same components, and when these components are referred to as a whole, the last letter signs will be omitted, specifically:

DETAILED DESCRIPTION

Further descriptions of the present invention are given as follows in combination with the figures and the specific embodiments.

Figure 1:
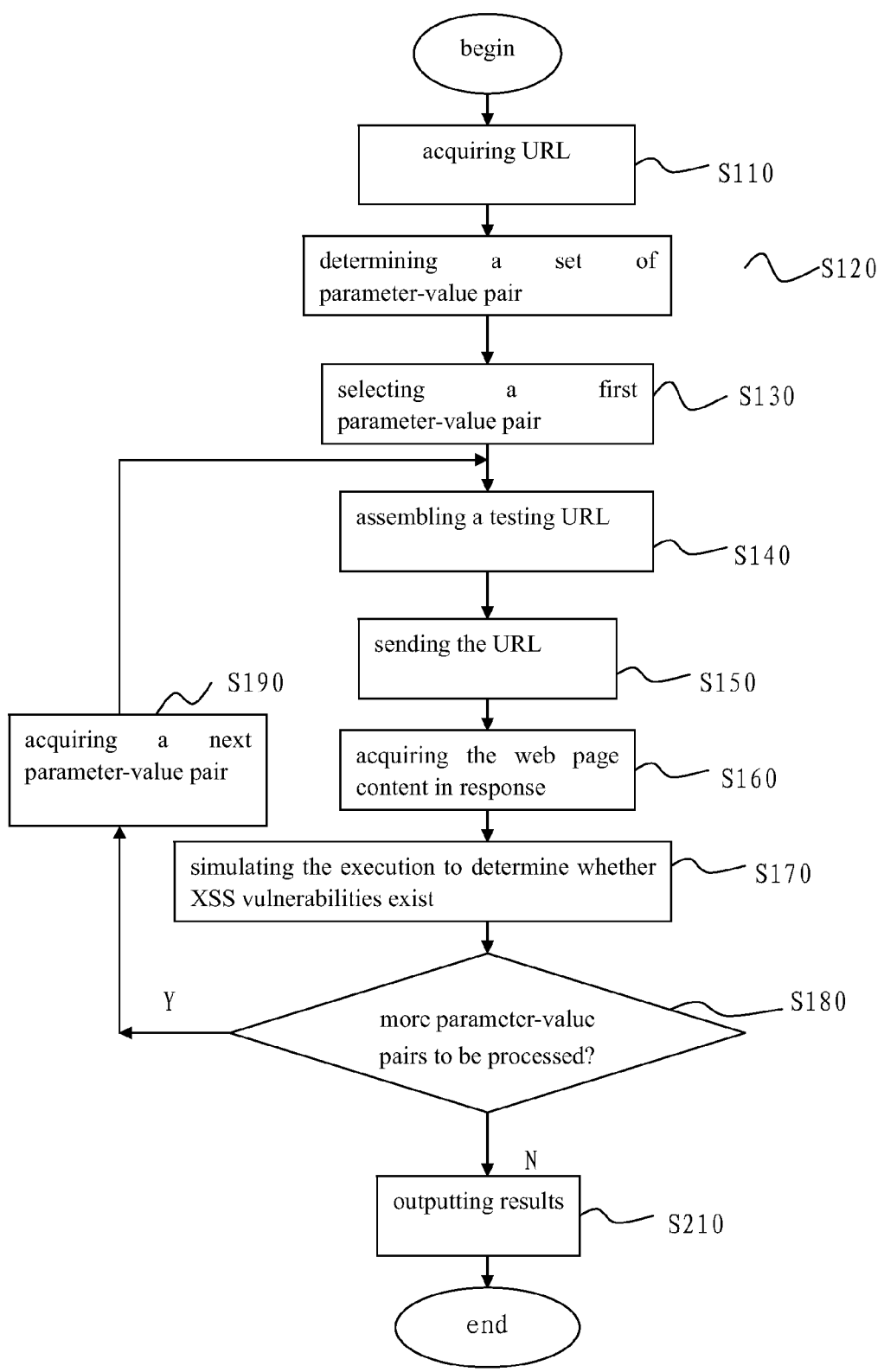
FIG. 1 shows a flow chart of a method for detecting XSS vulnerabilities in a web page according to an embodiment of the present invention.

FIG. 1 shows a flow chart of a method for detecting XSS vulnerabilities in a web page according to an embodiment of the present invention.

In step S110, the URL of a web page for which XSS detection to be performed is acquired, and then in step S120, a set of parameter-value pairs that can be accepted by the web page is determined. In light of the principles of XSS, a web page having XSS vulnerabilities is a web page dynamically generated by a web server, so it can usually accept some parameters and the corresponding values according to the HTTP protocols. For example, if the URL of the web page to be detected is http://www.test.com/test.asp?id=1&name=test, it can be determined that the parameters that can be accepted by the web page include id and name. The set of parameters that can be accepted by the dynamic URL can be determined in various ways, for instance, by monitoring the detailed content of URL for accessing to the dynamic web page, or by detecting the content of the FORM sent to the web server in accordance with the HTTP protocols, etc. Therefore, these all fall within the protection scope of the present invention.

After the acquisition of the set of parameter-value pairs in step S120, the first parameter-value pair in the set is selected in step S130, and then in step S140, the value in the selected parameter-value pair is amended to assemble the testing URL. Specifically, according to an embodiment of the present invention, a dedicated javascript is embedded in the value, and if the dynamic web page has XSS vulnerabilities, the embedded javascript will not be processed by the web server but instead, exist in the returned dynamic web page content. In the present invention, whether the web page has XSS vulnerabilities is determined by monitoring whether the javascript will exist in the dynamic web page and will be executed. In order to avoid conflicts of the embedded javascript with an existing javascript in the dynamic web page, the embedded javascript should be unique, for instance, it comprises unique script parameter content. Moreover, as the alert function in the javascript acts to show a message box without exerting other influence on the file content. Therefore, in a further embodiment of the present invention, the alert function is embedded in the selected parameter-value pair.

For example, in the URL: http://www.test.com/test.asp?id=1&name=test mentioned above, a function <script>alert(0)</script> can be embedded in the corresponding value during the modification of parameter id. So the constructed URL becomes:
http://www.test.com/test.asp?id=1<script>alert(0)</script>&name=test.

Alternatively, in light of the HTTP protocols, the parameters submitted to the web server do not have fixed sequence, so the sequence of the parameters can be modified such that the embedded value can be put in the end, i.e.:
http://www.test.com/test.asp?name=test&id=1<script>alert(0)</script>.

Besides, apart from a javascript, specific characters can also be added during the modification of the value of parameters, e.g., ">", "<" and "%20". So the constructed URL can also be:
http://www.test.com/test.asp?name=test&id=1%20<script>alert(0)</script> or
http://www.test.com/test.asp?name=test&id=1%20><script>alert(0)</script>
and the like.

In addition, during the modification of the value of parameter, in order to ensure that the inserted script can be executed by the javascript parsing engine when the processing of the parameter contains XSS vulnerabilities, the resumption of html grammar should also be taken into consideration, for example, if the html code generated by the dynamic web page is:
<pre>the name you entered is test</pre>
wherein test is generated based on the value of parameter id by the dynamic web page. In this case, if only a javascript is added in the value of parameter id, i.e., id=<script>alert(0)</script>, the javascript generated by the dynamic web page is comprised in the html identifier of <pre></pre> and cannot be executed by the javascript paring engine. In this regard, we need to modify the script inserted in the parameter id value as id=</pre><script>alert(0)</script><pre>, and the html code generated by the dynamic web page becomes:
<pre>the name you entered is </pre><script>alert(0)</script><pre>,
which ensures that the inserted script (e.g., an alert function) can be executed by the parsing engine.

The above <pre> tag is only an example, and there are other cases which may result in insertion of a script. Thereby, when a javascript is inserted in the value of a parameter, the resumption of html grammar should also be taken into consideration so ensure that the inserted javascript can be executed when the processing of the parameter contains XSS vulnerabilities. Therefore, for the insertion of the javascript, different ways of insertion should be performed so as to determine the XSS vulnerabilities more precisely.

After the testing URL is assembled in step S140, the assembled URL is sent to the web server in step S150 to request for the dynamic web page content, and the dynamic web page content in response is acquired in step S160. Subsequently, in step S170, the javascript parsing engine according to the present invention is used to simulate the execution of the dynamic web page content, and to determine whether the parameter has XSS vulnerabilities depending on whether the dedicated script inserted in step S140 is executed by the javascript parsing engine. The processing in step S170 will be described in detail with reference to FIG. 2, and we will not go further on this issue.

After the determination regarding whether the parameter has XSS vulnerabilities in step S170, it is determined in step S180 whether the set of parameters has further parameters for judgment. If so, the next parameter-value pair to be processed in the set of parameters will be acquired in step S190, and the methond return back to step S140, so that the parameter-value pair will be processed. If it is determined in step S180 that no more parameters need to be processed, the processing results of all the parameters in the set of parameters will be output in step S210 and the XSS detection of the web page will be finished.

It should be noted that in step S140, it has been described that a plurality of dedicated URLs can be assembled with respect to one single parameter. According to a further embodiment of the present invention, steps S140-S170 can be performed repeatedly to send each specially assembled URL to the web server so as to ensure whether the web page contains XSS vulnerabilities, which enables more comprehensive detection of the web page.

Figure 2:
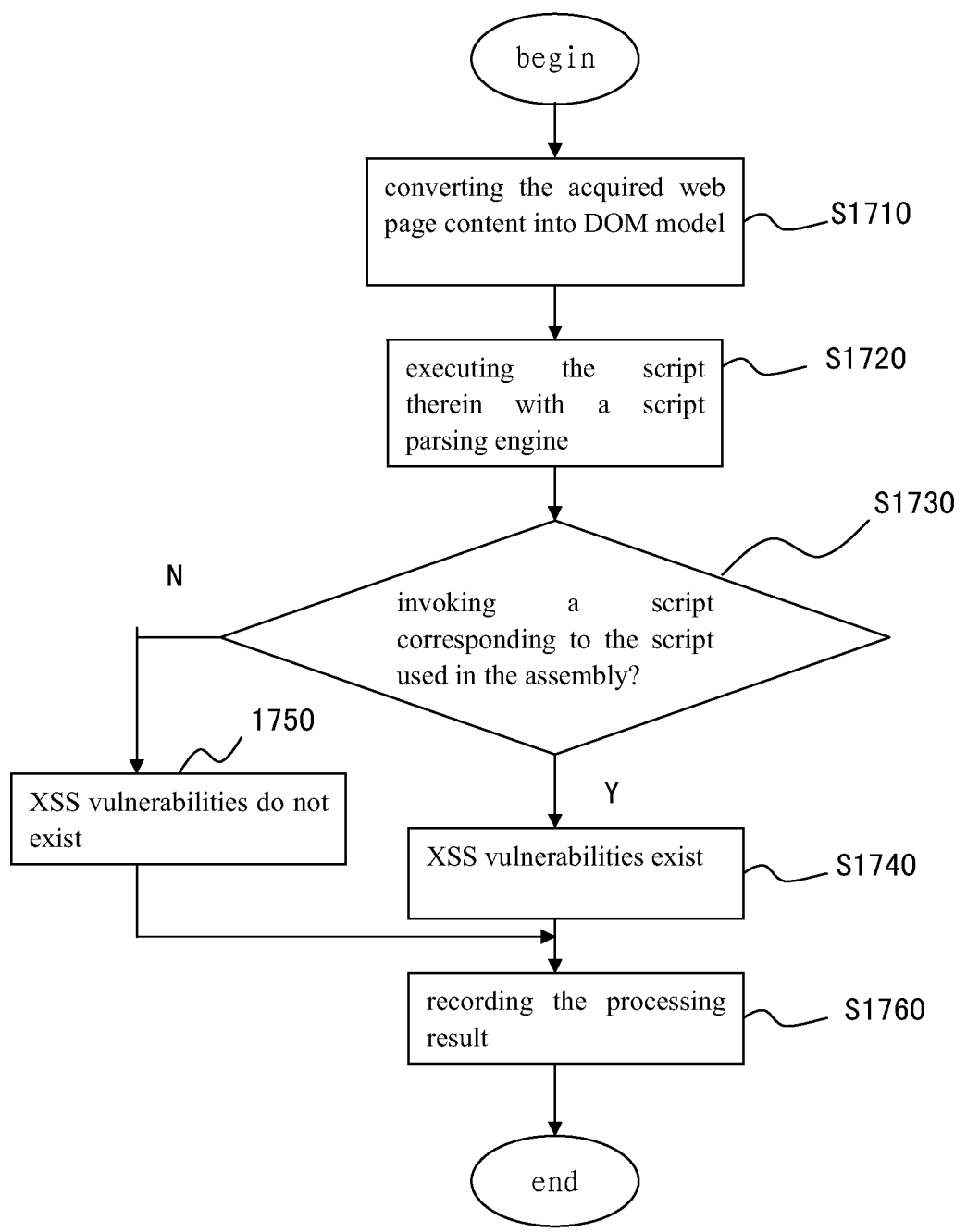
FIG. 2 shows a flow chart of a method for determining whether the processing of a certain parameter by a web server has XSS vulnerabilities according to an embodiment of the present invention.

FIG. 2 shows a flow chart of a method 1700 performed in step S170 for determining whether the processing of a certain parameter by the web server exist XSS vulnerabilities.

In step S1710, the acquired web page content is converted into DOM model. In order to present the web page content at the client end, it is one of the conventional technical measures to convert the web page content into DOM model. The present invention needs to simulate the execution of the acquired web page content, so the web page content is first converted into DOM model. Subsequently in step S1720, the javascript parsing engine according to the present invention is used to execute the javascript in the DOM model. As mentioned above, a dedicated javascript has been inserted into the value of the parameter during the assembly of a dedicated URL for the certain parameter. Therefore, in step S1730, it is determined whether the processing of the parameter by the web server exist XSS vulnerabilities depending on whether the javascript parsing engine executes the dedicated script. If the dedicated script is triggered and executed, it means that XSS vulnerabilities exist (S1740); if not, it means that XSS vulnerabilities do not exist (S1750). After that, the determination result of whether the processing of the parameter exist XSS vulnerabilities is recorded in step S1760, and the method is finished.

It should be noted that the method shown in FIG. 2 mainly aims to simulate the execution of the returned web page content by using the javascript parsing engine according to the present invention, so all manners that can simulate the execution of the web page fall within the protection scope of the present invention.

In addition, as mentioned above, in the javascript, the alert function acts to popup a message box without exerting influence on the web page content. Therefore, the script inserted in the value of a parameter is preferably an alert function, and the javascript parsing engine according to the present invention also modifies the processing of the alert function so as to determine whether the processing of the parameter exist XSS vulnerabilities depending on whether the alert function is triggered.

Figure 3:
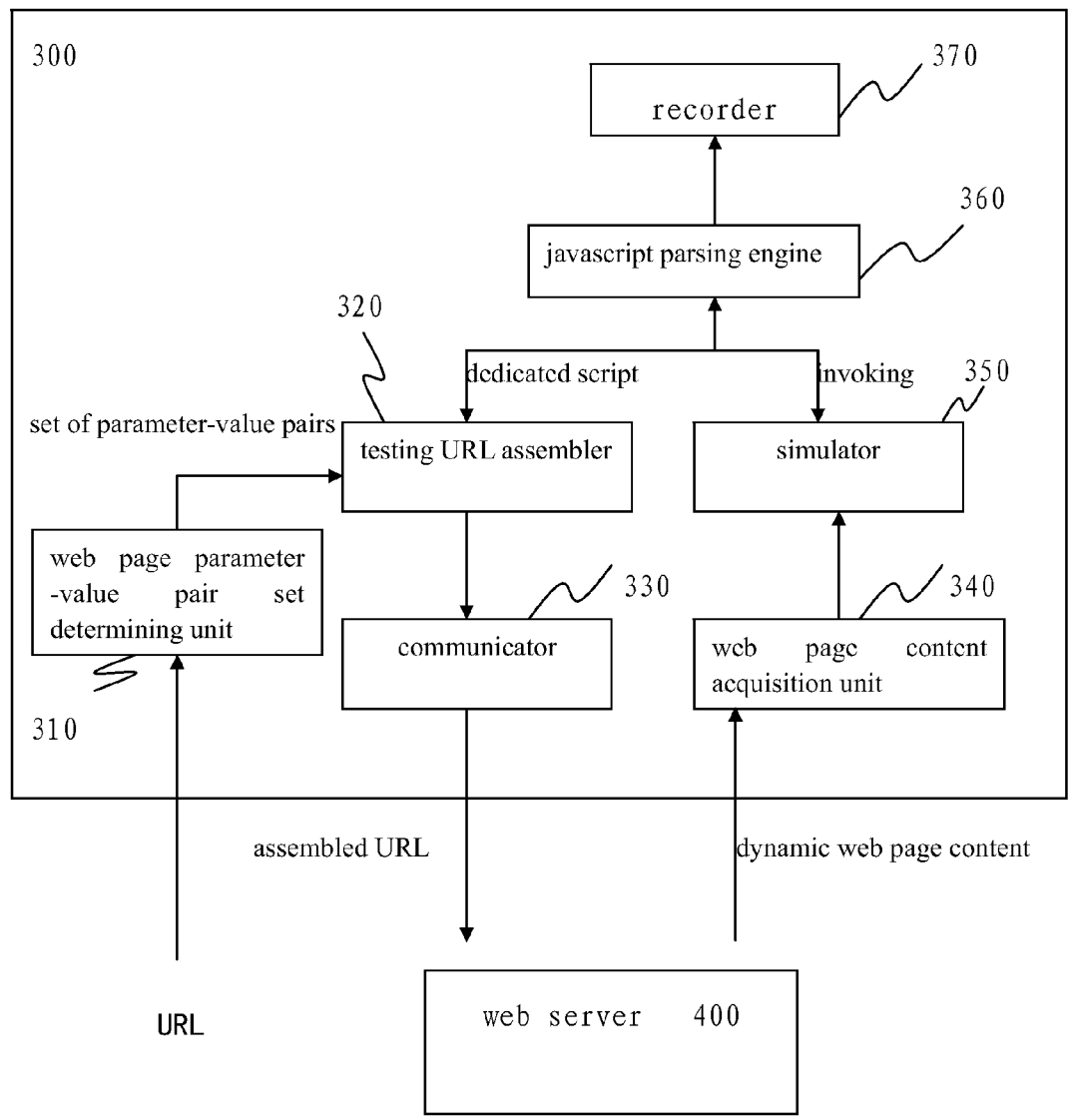
FIG. 3 shows a diagram of a XSS detection device for detecting XSS vulnerabilities in a web page according to an embodiment of the present invention.

FIG. 3 shows a diagram of a XSS detection device for detecting XSS vulnerabilities in a web page according to an embodiment of the present invention.

As shown in FIG. 3, XSS detection device 300 comprises a web page parameter-value pair set determining unit 310, a testing URL assembler 320, a communicator 330, a web page content acquisition unit 340, a simulator 350, a javascript parsing engine 360 and a recorder 370.

The web page parameter-value pair set determining unit 310 determines a set of parameter-value pairs that can be accepted by a certain dynamic web page. As mentioned in step S110, the set of parameter-value pairs that can be accepted by the dynamic web page can be determined in various ways. Subsequently, the web page parameter-value pair set determining unit 310 sends the determined set of parameter-value pairs to the testing URL assembler 320.

The testing URL assembler 320 constructs a testing URL for each parameter-value pair in the received set of parameter-value pairs. During constructing the testing URL for a certain parameter-value pair, the testing URL assembler 320 inserts in the value a corresponding javascript with reference to the javascript parsing engine 360 customized in the present invention, such as the aforementioned <script>alert(0)</script>, so that the corresponding javascript will be triggered in the javascript parsing engine 360 when the parameter has XSS vulnerabilities. Therefore, the javascript parsing engine 360 in the present invention provides a javascript to be inserted in the value.

As mentioned above, the testing URL assembler 320 may construct a plurality of URLs comprising a dedicated javascript and different special characters for a parameter-value pair, and these assembled URLs can be tested respectively.

The communicator 330 receives the URL assembled by the testing URL assembler 320 and sends the URL to the web server 400 to request for a dynamic web page. In response, the web server 400 sends the generated dynamic web page to the web page content acquisition unit 340 which acquires the dynamic web page and delivers the content of the dynamic web page to the simulator 350 for detecting whether the dynamic web page contains XSS vulnerabilities.

In practice, the functions of the communicator 330 and the web page content acquisition unit 340 can be combined in one same communicator for unified execution of the related network functions. These all fall within the protection scope of the present invention.

The simulator 350 simulates the execution of the acquired web page content in various manners, for example, processing the web page content with kernels of browser such as IE, Firefox and/or Chrome, and converting the web page content into DOM model and then executing the javascript in the web page by the javascript parsing engine 360.

When executing the javascript, the javascript parsing engine 360 determines whether the javascript provided to be inserted in the value is triggered. If so, it is determined that the processing of the parameter in the dynamic web page by the web server contains XSS vulnerabilities. If not, it is determined that the processing of the parameter does not have XSS vulnerabilities. After that, the javascript parsing engine 360 sends the determination result to the recorder 370 for recording.

In the above XSS detection device, an approach of XSS detection for a dynamic web page has been disclosed. The XSS detection device can be incorporated in a web site security scanning system or a web scanning system to provide XSS detection for each dynamic web page scanned by the web site security scanning system or the web scanning system, thereby scanning XSS vulnerabilities for a certain web site or web sites.

As the major purpose of the javascript parsing engine 360 in the present invention is to determine whether the dedicated javascript function has been triggered in the returned dynamic web page, in order to increase the execution efficiency of the javascript parsing engine 360, the execution of other javascript functions can be simplified, for instance, by only realizing the interface without performing any substantive operations, so as to accelerate the simulated execution of the dynamic web page content.

The XSS detection method and device according to the present invention determine whether the dynamic web page contains XSS vulnerabilities by assembling a URL with a value of parameter having a dedicated script and detecting whether the dynamic web page content returned from the URL can trigger the dedicated script. Compared with the traditional approach of characteristic matching by simply determining whether the corresponding content will appear in the dynamic web page, the present invention boasts of higher accuracy. Besides, with the development of AJAX techniques, the presenting and the processing manner at the client end become increasingly complicated and the traditional approach of characteristic matching cannot determine the XSS vulnerabilities precisely. Since XSS vulnerabilities will finally effect by executing the script, the present invention can be well applied to the web page content of Rich Client ends.

It should be noted that in the XSS detection device according to the present invention, components therein are logically divided in light of the functions to be achieved. However, the present invention is not limited by this and the components of the XSS detection device can be redivided or recombined upon needs, for instance, some components can be combined as an individual component or some components can be further divided into more sub-components.

The embodiments of the present invention can be carried out by hardware or by software modules run on one or more processors, or by the combination of the two. One skilled in the art should understand that microprocessors or digital signal processors (DSP) can be used in practice to carry out some or all of the functions of some or all of the components of the XSS detection device according to the embodiments of the present invention. The present invention can further be implemented as device or means programs (for example, computer programs and computer program products) for executing part or all of the method described herein. Such programs carrying out the present invention can be stored in a computer-readable medium, or have the form of one or more signals. Such signals can be downloaded from Internet websites or provided by a carrier signal or provided in any other forms.

It should be noted that the above embodiments illustrate rather than limit the invention, and that those skilled in the art will be able to design alternative embodiments without departing from the scope of the appended claims. In the claims, any reference signs placed between parentheses shall not be construed as limiting the claim. The word "comprise" does not exclude the existence of elements or steps other than those listed in a claim. The word "a" or "an" preceding an element does not exclude the existence of a plurality of such elements. The present invention can be achieved by means of hardware comprising several different elements and by means of an appropriately programmed computer. In unit claims listing several means, several of these means can be embodied by one and the same item of hardware. The use of ordinal words such as first, second and third does not represent any order, but instead, they can be understood as titles.

The invention claimed is:

1. A cross-site scripting (XSS) detection method for detecting XSS vulnerabilities in a web page, comprising steps of:
    determining a set of parameter-value pairs that can be accepted by the web page;
    and for each parameter-value pair in the set:
        constructing a parameter-value pair in which a dedicated script is inserted;
        assembling a URL corresponding to the web page based on the parameter-value pair in which the dedicated script has been inserted, wherein the URL is assembled by modifying a sequence of the parameter-value pair in which the dedicated script has been inserted by adding the dedicated script at an end of the URL and by adding a closing tag of a hypertext markup language element or a specific character before the dedicated script;
    wherein in assembling the URL corresponding to the web page, a plurality of URLs are assembled by changing the sequence of the parameter-value pairs and by inserting other special codes in the URL;
    acquiring dynamic web page content corresponding to the assembled URL;
    simulating the execution of the dynamic web page content, wherein the steps of acquiring the dynamic web page content and simulating the execution of the dynamic web page content are performed respectively for each one of the plurality of URLs, and
    determining when the dedicated script is executed, that the processing of the parameter-value pair in the web page contains XSS vulnerabilities.

2. The XSS detection method according to claim 1, wherein in simulating the execution of the dynamic web page content, a script parsing engine is used to execute scripts in the web page content and the script parsing engine is constructed to determine whether XSS vulnerabilities exist depending on whether the dedicated script is triggered.

3. The XSS detection method according to claim 1, wherein the dedicated script is an alert function.

4. The XSS detection method according to claim 1, further comprising:
   recording whether a parameter in the set of parameter-value pairs contains XSS vulnerabilities.

5. A cross-site scripting (XSS) detection device for detecting XSS vulnerabilities in a web page, comprising hardware and:
   a web page parameter-value pair set determining unit configured to determine a set of parameter-value pairs that can be accepted by the web page;
   a testing URL assembler configured to assemble a testing URL for each parameter-value pair in the set of parameter-value pairs, wherein a dedicated script is inserted in the value of the parameter-value pair during the assembly of the testing URL and, wherein the testing URL is assembled by modifying a sequence of the parameter-value pair in which the dedicated script has been inserted by adding the dedicated script at an end of the testing URL and by adding a closing tag of a hypertext markup language element or a specific character before the dedicated script; wherein the testing URL assembler is configured to assemble a plurality of testing URLs by changing the sequence of the parameter-value pair and by inserting other special codes in the URL when assembling the testing URL;
   a communicator configured to send each testing URL to a web server and receive dynamic web page content returned from the web server in order to detect XSS vulnerabilities for each testing URL; and
   a simulator configured to simulate the execution of the dynamic web page content and determine the existence of XSS vulnerabilities in the parameter-value pair when the dedicated script has been executed.

6. The XSS detection device according to claim 5, further comprising:
   a script parsing engine, with which the simulator executes the script when simulating the execution of the web page content, wherein the script parsing engine determines whether XSS vulnerabilities exist in the parameter-value pair depending on whether the dedicated script has been triggered.

7. The XSS detection device according to claim 5, wherein the dedicated script is an alert function.

8. The XSS detection device according to claim 5, further comprising a recorder configured to record whether a parameter in the set of parameter-value pairs contains XSS vulnerabilities.

9. A non-volatile computer readable medium including instructions that, when executed by a microprocessor, cause the following steps to be performed:
   determining a set of parameter-value pairs that can be accepted by a web page; and for each parameter-value pair in the set:
      constructing a parameter-value pair in which a dedicated script is inserted;
      assembling a URL corresponding to the web page based on the parameter-value pair in which the dedicated script has been inserted, wherein the URL is assembled by modifying a sequence of the parameter-value pair in which the dedicated script has been inserted by adding the dedicated script at an end of the URL and by adding a closing tag of a hypertext markup language element or a specific character before the dedicated script;
      wherein in assembling the URL corresponding to the web page, a plurality of URLs are assembled by changing the sequence of the parameter-value pairs and by inserting other special codes in the URL;
      acquiring dynamic web page content corresponding to the assembled URL;
      simulating the execution of the acquired dynamic web page content, wherein the steps of acquiring the dynamic web page content and simulating the execution of the dynamic web page content are performed respectively for each one of the plurality of URLs, and
      when the dedicated script is executed, it is determined that the processing of the parameter-value pair in the web page contains cross-site scripting (XSS) vulnerabilities.

* * * * *